United States Patent
Helfinstine et al.

(10) Patent No.: US 12,549,510 B2
(45) Date of Patent: Feb. 10, 2026

(54) METHODS AND SYSTEMS FOR ACCESSING CONTENT

(71) Applicant: Comcast Cable Communications, LLC, Philadelphia, PA (US)

(72) Inventors: Charles Helfinstine, Philadelphia, PA (US); Yiu Lee, Philadelphia, PA (US); Thomas Modayil Jacob, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/244,472

(22) Filed: Apr. 29, 2021

(65) Prior Publication Data
US 2022/0353233 A1 Nov. 3, 2022

(51) Int. Cl.
*H04L 61/4511* (2022.01)
*H04L 67/02* (2022.01)

(52) U.S. Cl.
CPC .......... *H04L 61/4511* (2022.05); *H04L 67/02* (2013.01)

(58) Field of Classification Search
CPC ... H04L 61/1511; H04L 67/02; H04L 61/4511
See application file for complete search history.

(56) References Cited

U.S. PATENT DOCUMENTS 8,825,999 B2 * 9/2014 Mohamed ........... H04L 63/0823
713/153
2016/0352704 A1 * 12/2016 Li ........................ H04L 9/321

OTHER PUBLICATIONS

Cloudflare, "What is Encrypted SNI? How ESNI Works," Dec. 16, 2020. (Year: 2020).*
P. Mockapetris, RFC 1035: Domain Names—Implementation and Specification, 1987. (Year: 1987).*
E Rescorla et al., "Encrypted Server Name Indication for TLS 1.3," 2018. (Year: 2018).*

* cited by examiner

*Primary Examiner* — Andrew C Georgandellis
(74) *Attorney, Agent, or Firm* — Ballard Spahr LLP

(57) ABSTRACT

An identifier, for example, an identifier of a domain and/or a host of the domain (e.g., a fully qualified domain name (FQDN), etc.), such as a service management device (e.g., a server, a web server, a computing device, a web host device, a webpage, etc.), may be modified (e.g., hashed, encrypted, etc.) by a network device (e.g., a server, a domain name system (DNS) server, a DNS over hypertext transfer protocol secure (HTTPS) server/gateway (DoH server), DNS over Transport Layer Security (TLS) server/gateway (DoT server), a network management device, a computing device, etc.), sent to a user device (e.g., a client device, a smart device, a mobile device, a content output device, a computing device, a web browser, a search engine, etc.), and reused by the user device to request a service (e.g., a web service, a webpage, a file, content, a content item, etc.).

68 Claims, 7 Drawing Sheets

METHODS AND SYSTEMS FOR ACCESSING CONTENT

BACKGROUND

Network security, particularly for a user device (e.g., a client device, a smart device, a mobile device, a content output device, a computing device, a web browser, a search engine, etc.) accessing a network, is important. Network communication processes and schemes have been developed to prevent nefarious data snoopers and listeners from intercepting data/information communicated within a network (e.g., Internet, public networks, private networks, etc.) by a user device. For example, processes such as encrypted domain name service (DNS) and encrypted server name indication (eSNI) aim to prevent data leaks by encrypting initial communications (e.g., an initial Client Hello message, etc.). Nefarious actors (e.g., data snoopers and listeners, etc.) routinely identify ways to circumvent network communication processes and schemes that aim to prevent data leaks. Improvements in network communication processes and schemes that counteract actions by nefarious actors are needed.

SUMMARY

It is to be understood that both the following general description and the following detailed description are exemplary and explanatory only and are not restrictive. Methods and systems for accessing content are described. Content may be accessed, for example, based on a modified version of an identifier.

A user device (e.g., a client device, a smart device, a mobile device, a content output device, a computing device, a web browser, a search engine, etc.) attempting to reach and/or access a domain (e.g., an Internet domain, a website, a webpage, etc.) and/or content hosted by a domain, such as "comcast.com," "xfinity.com," and/or the like, may communicate with a name server (e.g., a network device, a server, a domain name system (DNS) server, a DNS over hypertext transfer protocol secure (HTTPS) server/gateway (DoH server), DNS over Transport Layer Security (TLS) server/gateway (DoT server), a network management device, a computing device, etc.) to obtain a network address (e.g., an Internet protocol (IP) address, etc.) associated with the domain. The network device may determine and send the network address, a modified (e.g., hashed, encrypted, etc.) identifier (e.g., a fully qualified domain name, etc.) of the domain, and an indication of the modified version of the identifier to the user device. The user device, based on the indication of the modified version of the identifier, may use the network address to communicate with a host (e.g., a web server, etc.) of the domain and request a service (e.g., web service, etc.), a resource, and/or content associated with the modified version of the identifier. The host may determine the modified version of the identifier from initial communication (e.g., handshaking, etc.) with the user device, and use the modified version of the identifier to facilitate the user device receiving the service, the resource, and/or the content associated with the modified version of the identifier.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
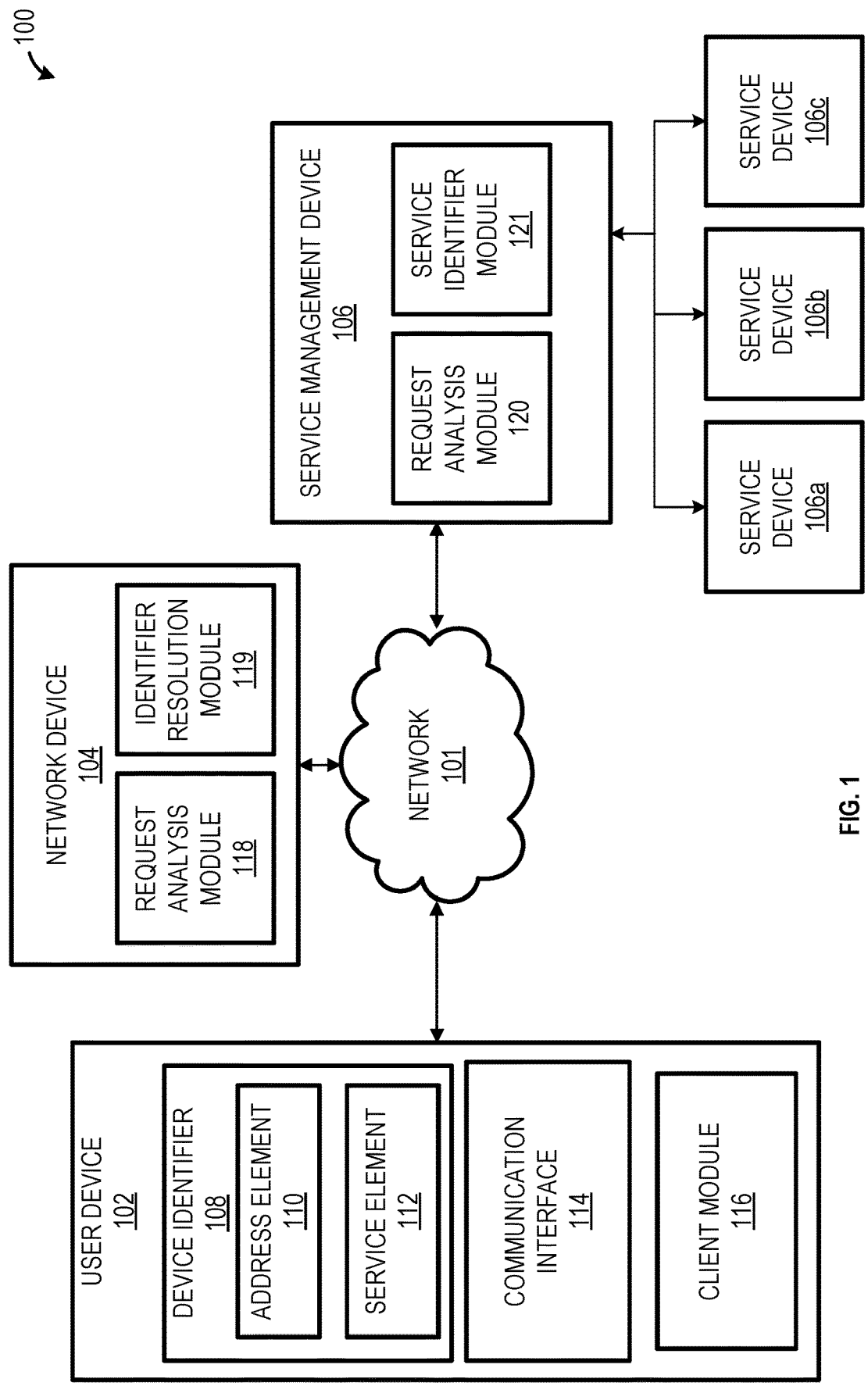
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as businesses or groups). Content may be electronic representations of video, audio, text, and/or graphics, which may be but is not limited to electronic representations of videos, movies, or other multimedia, which may be but is not limited to data files adhering to MPEG2, MPEG, MPEG4 UHD, HDR, 4 k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Network security protocols and/or processes, for example, encrypted domain name service (DNS), encrypted server name indication (eSNI), and/or the like, aim to prevent data leaks by encrypting initial communications (e.g., an initial Client Hello message, etc.). However, such processes operate independently, for example, causing significant overhead due to public key distribution, and do not share cryptographic information, such as a cryptographic identifier (e.g., a hashed fully qualified domain name (FQDN), etc.). Security element exchange communications, such as public key distribution, and independently determining and using cryptographic information causes the computational and/or process time for processes such as encrypted domain name service (DNS) and encrypted server name indication (eSNI) to be extended. The extended computational and/or process time may degrade a user experience.

To improve a user experience, for example, when a user device (e.g., a client device, a smart device, a mobile device, a content output device, a computing device, a web browser, a search engine, etc.) is attempting to access a service (and/or resource) (e.g., a web service, a webpage, a file, content, a content item, etc.), the user device may communicate with one or more network devices (e.g., a server, a service management device, etc.) using an identifier associated with the service that has been modified based on at least a device type, a request type, a relationship between the one or more network devices, and/or the like.

For example, a user device attempting to access a service (and/or resource) (e.g., a web service, a webpage, a file, content, a content item, etc.) may receive an identifier (e.g., a device identifier, a server name indication (SNI), a fully qualified domain name (FQDN), a service identifier, etc.) of a service management device (e.g., a server, a web server, a computing device, a web host device, a webpage, etc.) and/or the service that may be used to request the resource and/or access to the service. For example, a user device, attempting to reach and/or access a domain (e.g., an Internet domain, a website, a webpage, etc.), such as "comcast.com," "xfinity.com," and/or the like, may communicate with a network device (e.g., a server, a domain name system (DNS) server, a DNS over hypertext transfer protocol secure (HTTPS) server/gateway (DoH server), DNS over Transport Layer Security (TLS) server/gateway (DoT server), a network management device, a computing device, etc.) and request a network address (e.g., an Internet protocol (IP) address, etc.) associated with the domain. The request for the network address may be sent by the user device, for example, as a DoH request, a DoT request, a DNS query (e.g., a recursive query, an iterative query, a non-recursive query, etc.), a DoH DNS query, and/or the like. The request for the network address may be sent, for example, as part of a DoH (and/or DoT) communication process between the user device and the network device.

The network device may receive the request for the network address and determine, generate, and/or translate a corresponding identifier of the service management device, the resource, and/or a service device (e.g., a web service device, a file server, a computing device, etc.) associated with the service (and/or resource). For example, based on the request for the network address, the network device may determine, generate, and/or translate an FQDN. The FQDN may be an identifier (e.g., a domain name, a device identifier, a resource identifier, a service identifier, etc.) for a specific device (and/or host) associated with a network (e.g., Internet, etc.). The FQDN may include one or more parts, for example, a hostname and/or a domain name. For example, an FQDN for a content server may be "myaccount.xfinity.com." The hostname, for example, may be "myaccount," and the host may be located within the domain xfinity.com.

The network device may determine, generate, and/or translate an FQDN (e.g., my account.xfinity.com, myvideos.comcast.com, etc.) of the service management device (e.g., xfinity.com, comcast.com, etc.), the service (and/or resource) (e.g., "my account," "myvideos," etc.), and/or a service device (e.g., "my account," "myvideos," etc.). The network device may determine/generate a modified version of an identifier. The modified version of the identifier may be, for example, a hash of the identifier, an encrypted version of the identifier, a scrambled version of the identifier, and/or any other cryptographic version of the identifier. For example, the network device may determine/generate a hashed FQDN of the service management device, the service (and/or resource), and/or a service device. The network device may send the modified version of the identifier, the network address, and an indication of the modified version of the identifier to the user device. The network device may send the modified version of the identifier, the network address, and an indication of the modified version of the identifier to the user device, for example, as a DoH DNS response.

The user device may receive and store (e.g., cache, etc.) the modified version of the identifier and the network address. The user device, based on the indication of the modified version of the identifier, may modify a request for the service before sending the request to the service management device. The modified request may include the modified version of the identifier. For example, the indication of the hashed identifier may cause the user device to modify a server name indication (SNI) field of a Transport Layer Security (TLS) Client Hello message to include a hash of the identifier received from the network device instead of clear-text FQDN and send the request (e.g., an encrypted server name indication (ESNI) request, an TLS/HTTPS request, etc.) to the service management device.

The service management device may receive the modified version of the identifier and determine that the modified version of the identifier (e.g., at least a portion of the modified version of the identifier, etc.) corresponds to a service device (e.g., a web service device, a file server, a computing device, etc.) associated with the requested resource. For example, the service management device may receive the modified version of the identifier and determine that at least a portion of the modified version of the identifier matches an identifier (and/or at least a portion of the identifier) associated with the service device, data/information (e.g., a file, etc.) associated with the service, and/or the like. Based on the match, the service management device may facilitate the user device receiving a service (and/or resource). For example, the service management device may send the request to the service device with the matching identifier and/or enable a corresponding service for the user device based on the modified version of the identifier.

As described, the use of a modified version of an identifier may simplify the design of security protocols such as eSNI, eDNS, and/or the like, ensure hidden user device (and/or user) behavior when communicating with a network using protocols such as HTTPS, scale performance of a core network (e.g., Internet, etc.) protocol (e.g., HTTP, etc.), and/or the like. For example, by using a modified version of an identifier used for DoH for an HTTPS service request, a user device and service management device may avoid using a public key and/or hashing scheme to cryptographically exchange identities—thus reducing data overhead and communication latency. By reducing the amount of identity-based information communicated by a user device, the methods described herein thwart efforts of nefarious actors to intercept and/or exploit identity-based communications. The use of a modified version of an identifier determined during an eDNS (e.g., DoH, DoT, etc.) communication session for an eSNI communication session enables two protocols, eDNS and eSNI, designed to operate independently to operate collectively and/or in a collaborative manner.

FIG. 1 shows an example system 100. Although only certain devices and/or components are shown, the system may include a variety of other devices and/or components that support a wide variety of network and/or communication functions, operations, protocols, content, services, and/or the like. For example, the system 100 may support and/or facilitate a Domain Name System (DNS), Hypertext Transfer Protocol (HTTP), Hypertext Transfer Protocol Secure (HTTPS), DNS over HTTPS (DoH), Transport Layer Security (TLS) protocol, DNS over TLS (DoT), encrypted DNS, encrypted server name indication (eSNI) hash service, and/or the like. For example, the system 100 may implement eSNI using an arithmetic hash of a fully qualified domain name (FQDN) sent/received via DoH (and/or DoT).

The system 100 enables and or facilitates, for example, for encrypted DNS and/or eSNI, the use of a modified version of an identifier, such as a hashed FQDN and/or any other hashed value. The hashed FQDN may be generated/determined once and shared for encrypted DNS and eSNI services, rather than a separate generation of a hashed FQDN/value for eSNI. When a user device and/or client attempts to reach a website, such as "comcast.com," a DoH (and/or DoT) process may be used for network address resolution and determining/generating a hashed FQDN/value that is also used for eSNI. The system 100, via the use of a modified version of an identifier, shortens the communication duration required for establishing a TLS connection and/or accessing a service and/or a resource. For example, by using a modified version of an identifier determined by a DoH process, a user device (e.g., a client device, a smart device, a mobile device, a content output device, a computing device, a web browser, a search engine, etc.) and a service management device (e.g., a server, a web server, a computing device, a web host device, a webpage, etc.) may avoid the need to use a public key exchange and/or identifier hashing/modifying process during a communication session.

Traditional TLS connections/communications that do not use a modified version of an identifier determined by a DoH process require approximately twice as much computational and/or communication duration, which may cause network latency, decreased bandwidth, exposure to user device behavior and/or information, signal timeouts/retransmissions, user-experience degradation, and/or the like.

The system 100 may include a network 101. The network 101 may include a packet-switched network (e.g., an Internet protocol-based network), a non-packet switched network (e.g., quadrature amplitude modulation-based network), and/or the like. The network 101 may comprise network adapters, switches, routers, modems, and the like connected through wireless links (e.g., radiofrequency, satellite, etc.) and/or physical links (e.g., fiber optic cable, coaxial cable, Ethernet cable, or a combination thereof). The network 101 may comprise public networks, private networks, wide area networks (e.g., Internet), local area networks, and/or the like. The network 101 may comprise a content access network, content distribution network, and/or the like. The network 101 may be configured to provide communication from telephone, cellular, modem, and/or other electronic devices to and throughout the system 100. The network 101 and/or devices in communication and/or associated with the network 101 may provide, facilitate, and/or support one or more services, applications, and/or protocols, such as a Domain Name System (DNS), Hypertext Transfer Protocol (HTTP), Hypertext Transfer Protocol Secure (HTTPS), DNS over HTTPS (DoH), Transport Layer Security (TLS) protocol, DNS over TLS (DoT), encrypted DNS, encrypted server name indication (eSNI) hash service, and/or the like. The network 101 may be configured to be in communication with one or more of a user 102, a network device 104, a service management device 106, resources devices 106a, 106b, 106c, and/or any other device/component.

The user device 102 (e.g., a client device, a smart device, a mobile device, a content output device, a computing device, a web browser, a search engine, etc.) may be associated with a user identifier or device identifier 108. The device identifier 108 may be any identifier, token, character, string, or the like, for differentiating one user and/or user device (e.g., user device 102) from another user or user device. The device identifier 108 may identify a user or user device as belonging to a particular class of users or user devices. The device identifier 108 may comprise information relating to the user device such as a manufacturer, a model or type of device, a service provider associated with the user device 102, a state of the user device 102, a locator, a label, and/or classifier. Other information may be represented by the device identifier 108.

The device identifier 108 may comprise an address element 110 and a service element 112. The address element 110 may comprise a network address (e.g., an IP address, etc.), a media access control (MAC) address, or the like. The address element 110 may be used to establish a communication session between the user device 102, other devices and/or components of the system 100, and/or the like. The address element 110 may be used as an identifier and/or locator of the user device 102. The address element 110 may be persistent for a particular network.

The service element 112 may comprise an identification of a service provider associated with the user device 102 and/or with the class of user device 102. The class of the user device 102 may be related to a type of device, a device capability, type of service being provided, and/or a level of service (e.g., business class, service tier, service package, etc.). The service element 112 may comprise information associated with a communication service provider (e.g., Internet service provider) that is providing or enabling data flow such as communication services to the user device 102. The service element 112 may comprise information relating to a preferred service provider for one or more particular services relating to the user device 102. The address element 110 may be used to identify or retrieve data from the service element 112, or vice versa. The address element 110 and/or the service element 112 may be stored remotely from the user device 102 and retrieved by one or more devices such as the user device 102, the network device 104, and/or the service management device 106. Other information may be represented by the service element 112.

The user device 102 may include and/or be associated with a communication interface 114. The communication interface 114 may enable a user to interact with the user device 102, the network device 104, the service management device 106, and/or any other device/component of the system 100. The communication interface 114 may include and/or be associated with software, hardware, and/or interfaces that may be used to provide communication between a user and one or more of the user device 102, the network device 104, the service management device 106, and/or any other device/component of the system 100. The communication interface 114 may be used to request or query various files from a local source and/or a remote source, such as the network device 104, the service management device 106, the service devices 106a, 106b, 106c, and/or the like.

The user device 102 may include a client module 116. The client module 116 may be an application, such as a web application, a user-agent based application (e.g., a single-page (browser-based) application), a native application, a DNS client engine, a mobile application, and or the like that is implemented/run on and/or associated with the user device 102. The user device 102 may use the client module 107 to request a network address associated with a service management device (e.g., a server, a web server, a computing device, a web host device, a webpage, etc.), request a service/resource (e.g., a web service, a webpage, a file, content, a content item, etc.). The client module 116 may support and/or facilitate one or more services, applications, and/or protocols, such as a Domain Name System (DNS), Hypertext Transfer Protocol (HTTP), Hypertext Transfer Protocol Secure (HTTPS), DNS over HTTPS (DoH), Transport Layer Security (TLS) protocol, DNS over TLS (DoT), encrypted DNS, encrypted server name indication (eSNI) hash service, and/or the like.

A request to access a resource/content via a domain (e.g., an Internet domain, a website, a webpage, etc.), such as "comcast.com," "xfinity.com," and/or the like, may be sent, for example, by the user device 102. The domain may be hosted and/or managed by the service management device 106 (e.g., a server, a web server, a computing device, a web host device, a webpage, etc.).

The user device 102 may communicate, for example, via the client module 116, with the network device 104 (e.g., a server, a domain name system (DNS) server, a DNS over hypertext transfer protocol secure (HTTPS) server/gateway (DoH server), DNS over Transport Layer Security (TLS) server/gateway (DoT server), a network management device, a computing device, etc.) and request a network address (e.g., an Internet protocol (IP) address, etc.) associated with the domain and/or the service management device 106. The request for the network address may be sent via the client module 116, for example, as a DoH request, a DNS query (e.g., a recursive query, an iterative query, a non-recursive query, etc.), a DoH DNS query, and/or the like. The request for the network address may be sent, for example, as part of a DoH communication process between the user device 102 and the network device 104.

The network device 104 may receive the request for the network address and determine, generate, and/or translate a corresponding identifier of the service management device 106, the resource/content, and/or the service devices 106a, 106b, 106c. The network device 104 may determine, for example, via a request analysis module 118, if the request for the network address should be processed as a traditional service request, such as an encrypted DNS service request. For example, if a request includes and/or is associated with a request for a domain and/or a service management device (e.g., the service management device 106, etc.) for which the network device does not share a trust relationship, then the request for the network address may be processed as a traditional encrypted DNS service request (e.g., based on RFC8484, RFC7858, RFC 8310, etc.). If the network device 104 determines, for example, via a request analysis module 118, that a request includes and/or is associated with a request for a domain and/or a service management device (e.g., the service management device 106, etc.) for which the network device shares a trust relationship, then the request for the network address may be processed as a modified service request, such as a modified encrypted DNS service and/or modified DoH (and/or DoT) service request. For example, the network device 104 may determine a modified version of an identifier (e.g., a hash of an FQDN in a DoH request, etc.) of the domain and/or the service management device and send it to the user device 102 in a response (e.g., via a DoH DNS Response, etc.).

A trust relationship may exist if the network device 104 and a service management device (e.g., the service management device 106, etc.) are associated with the same administrative domain. For example, the network device 104 and the service management device 106 may be associated and/or operated by the same Content Distribution Network (CDN) provider and/or Content Service Provider (CSP) that provides both DNS and web services.

If the network device 104 determines, for example, via a request analysis module 118, that a request includes and/or is associated with a request for a domain and/or a service management device for which the network device shares a trust relationship, such as the service management device 106, the network device 104 may determine, generate, and/or translate a modified version of an identifier of the domain and/or the service management device 106. The network device 104 may include an identifier resolution module 119. The identifier resolution module 119 may resolve, generate, and/or determine network addresses for traditional encrypted DNS service requests (e.g., based on RFC8484, RFC7858, etc.). The identifier resolution module 119 may resolve, generate, and/or determine network addresses for modified encrypted DNS service requests and/or modified DoH service requests.

For example, for modified encrypted DNS service requests and/or modified DoH service requests, the identifier resolution module 119 may determine a hash of an identifier (e.g., an FQDN, etc.) associated with the request. The identifier resolution module 119 may use, for example, a hash algorithm such as SHA256, BLAKE3, SipHash, and/or the like.

The identifier resolution module 119 may determine a hash of an identifier associated with an encrypted DNS service request and/or a DoH service request based on a desired and/or provisioned level of security and or performance. For example, a complex hashing algorithm may provide enhanced security, but reduce performance due to an extended hash computation period. A simple hash may be used for high performance (e.g., a reduced computational duration, etc.) and lower security. For high performance and lower security, the identifier resolution module 119 may use a simpler hash algorithm such as CRC-32. For lower performance and higher security, the identifier resolution module 119 may use a keyed hash algorithm that uses rotating keys. Any hashing algorithm and/or technique may be used.

An identifier (e.g., an FQDN, etc.) of a domain and/or a service management device may be modified by any means. For example, the modified version of the identifier may be a hash of the identifier, an encrypted version of the identifier, a scrambled version of the identifier, and/or any other cryptographic version of the identifier.

The network device 104 may send the modified version of the identifier, the corresponding network address, and an indication of the modified version of the identifier to the user device 102 (e.g., the client module 116, etc.). The network device 104 may send the modified version of the identifier, the network address, and an indication of the modified version of the identifier to the user device 102, for example, as a DoH DNS response. The indication of the modified version of the identifier may be sent/returned to the user device 102, for example, in the DNS EDNS0 Header under Option Code (OPT) 17 (EDNS-Server-Tag). As used herein, the Header Option Code selected is a new use of the Option Code. The new use of the Option Code abides by standards for and/or pending for the Code.

The user device 102 may receive the modified version of the identifier, the corresponding network address of the service management device 106, and an indication of the modified version of the identifier. The user device 102 may store (e.g., cache, etc.) the modified version of the identifier and the network address. The user device 102, based on the indication of the modified version of the identifier, may modify a request for a service (e.g., hosted by the service management device 106 and/or facilitated via the service device 106a, 106b, 106c, etc.) before sending the request to the service management device 106. The modified request may include the modified version of the identifier. For example, the indication of the modified version of the identifier (e.g., hashed FQDN, hashed identifier, encrypted identifier, scrambled identifier, cryptographic version of the identifier, etc.) may cause the user device 102 to modify a server name indication (SNI) field of a Transport Layer Security (TLS) Client Hello message to include the modified version of the identifier instead of clear-text FQDN.

The user device 102 may send the modified request (e.g., an encrypted server name indication (ESNI) request, an TLS/HTTPS request, etc.) to the service management device 106.

The service management device 106 may include a request analysis module 120. The request analysis module 120 may listen for and/or receive incoming connections/communications to the service management device 106 and interact with the data/information being sent by the user device 102. The service management device 106 may receive the modified version of the identifier and determine, for example, via the request analysis module 120, a service device (e.g., the service devices 106a, 106b, 106c, etc.) and/or service (e.g., web service, network service, etc.) associated with the modified version of the identifier. The request analysis module 120 may be and/or include a TCP listener, a TLS listener, an HTTPS listener, and/or the like. The request analysis module 120 may support and/or facilitate any version (e.g., IPv4, IPv6, etc.) of Internet protocols, interfaces, communications, and/or the like.

The service management device 106 may, for example via the request analysis module 120, determine that the modified version of the identifier corresponds to a service device (e.g., a web service device, a file server, a computing device, etc.)

associated with the requested resource, such as at least one of the service devices 106a, 106b, 106c.

For example, the service management device 106 may include a service identifier module 121. The service identifier module 121 may store and/or include a pre-calculated and/or pre-determined list of modified versions of identifiers, such as hashed identifier values, encrypted identifiers, scrambled identifiers, and/or the like, that correspond to services hosted by the service management device 106. For example, the service identifier module 121 may store and/or include a pre-calculated, pre-determined, and/or the like list of FQDN Hash values that correspond to modified identifiers used and/or determined by the network device 104. The service management device 106 may use the service identifier module 121 to determine an appropriate service for the request from the user device 102 based on a modified version of an identifier in the Client Hello SNI field of an eSNI message.

By storing associations between modified versions of identifiers and services and/or service devices, the service management device 106 may avoid having to execute a cryptographic-based identity control process with the user device, such as de-hashing and/or decrypting an identifier of a service/resource and/or service device (e.g., service devices 106a, 106b, 106c, etc.)—allowing a service/resource to be available to the user device 102 faster (and/or more securely) than traditional methods.

The service management device 106 may send a request for a service and/or access a resource via the service devices 106a, 106b, 106c to the service devices 106a, 106b, 106c. The service devices 106a, 106b, 106c may enable a corresponding service and/or enable access to a resource for the user device 102 based on the modified version of the identifier.

Figure 2:
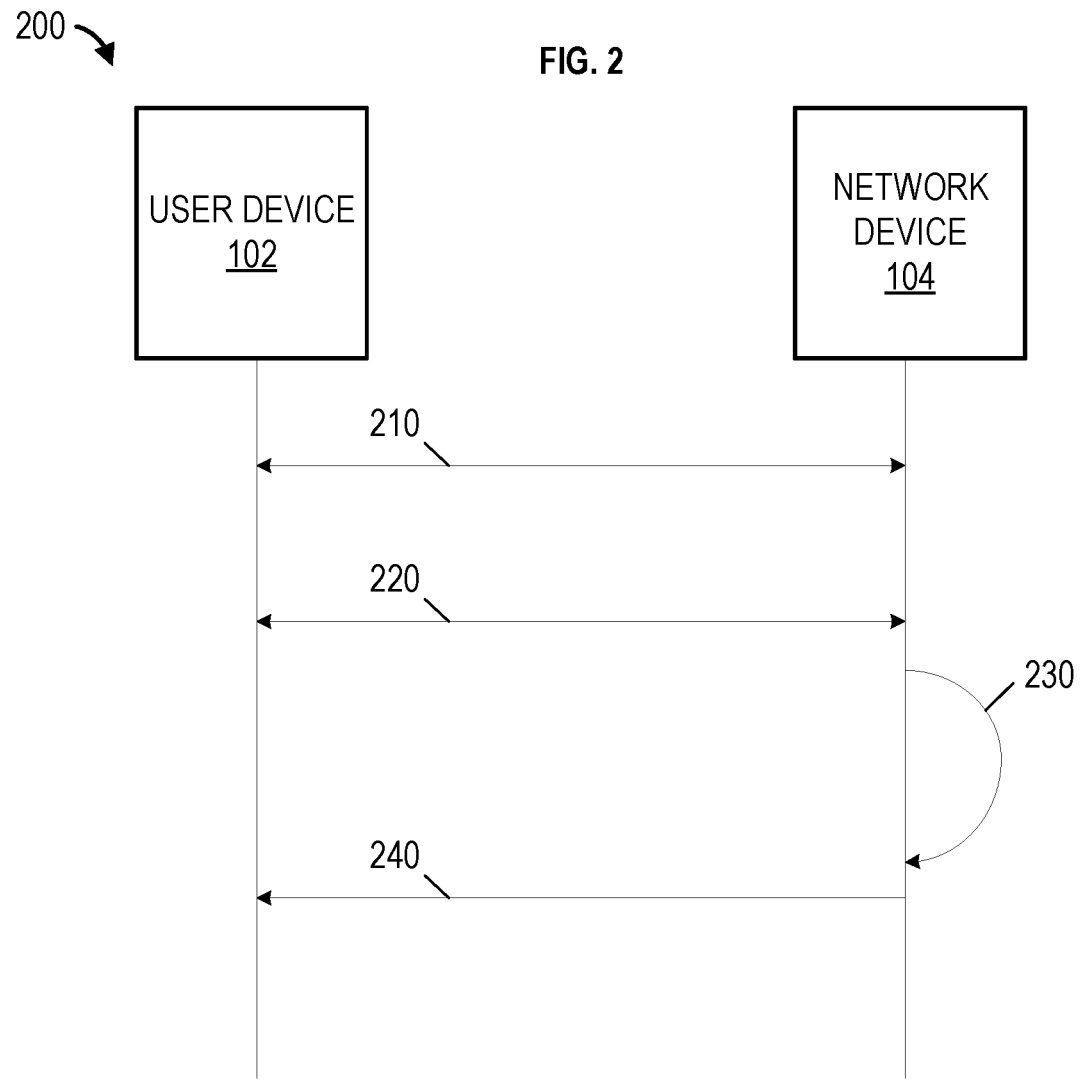
FIG. 2 shows an example communication diagram.

FIG. 2 shows an example communication diagram 200. The communication diagram 200 shows example communications between the user device 102 and the network device 104 implementing a modified DoH service.

The user device 102, in an attempt to reach and/or access a service/resource (e.g., a web service, a webpage, a file, content, a content item, etc.), may communicate with the network device 104. For example, the user device 102 may attempt to reach and/or access the domain name "xfinity.com" (e.g., a website, etc.) to stream a movie (e.g., receive content, etc.) and/or access an account (e.g., receive a web service, etc.).

At 210, the user device 102 and the network device 104 may participate and/or engage in introductory communications. For example, the user device 102 and the network device 104 may execute a DoH (and/or DoT) TLS Handshake (and/or any other encrypted DNS handshake).

At 220, the user device 102 may send a DoH HTTPS DNS query to the network device 104. For example, the user device 102 may send HTTP GET/POST for the FQDN of the host (e.g., the service management device 106, etc.) for the resource and/or service associated with "xfinity.com." The user device 102 may send a request for a network address (e.g., IP address, etc.) associated with the host.

At 230, the network device 104 may acknowledge the request, determine the network address, and determine a hash value for the FQDN.

The network device 104 may use a hash algorithm such as SHA256, BLAKE3, SipHash, and/or the like to determine the hash value for the FQDN.

The network device 104 may determine the hash value for the FQDN based on a desired and/or provisioned level of security and or performance. For example, a complex hashing algorithm may provide enhanced security, but reduce performance due to an extended hash computation period. A simple hash may be used for high performance (e.g., a reduced computational duration, etc.) and lower security. For high performance and lower security, the network device 104 may use a simpler hash algorithm such as CRC-32. For lower performance and higher security, the network device 104 may use a keyed hash algorithm that uses rotating keys. Any hashing algorithm and/or technique may be used.

At 240, the network device may reply to the user device 102. The reply may be, for example, a DoH HTTPS Response with DNS records for the FQDN. For example, the response may include the hash value for the FQDN, the network address, and an indication of the hash value for the FQDN. The indication of the hash value for the FQDN may be in the DNS EDNS0 Header of the reply to the user device 102 under Option Code (OPT) 17 (EDNS-Server-Tag).

Figure 3:
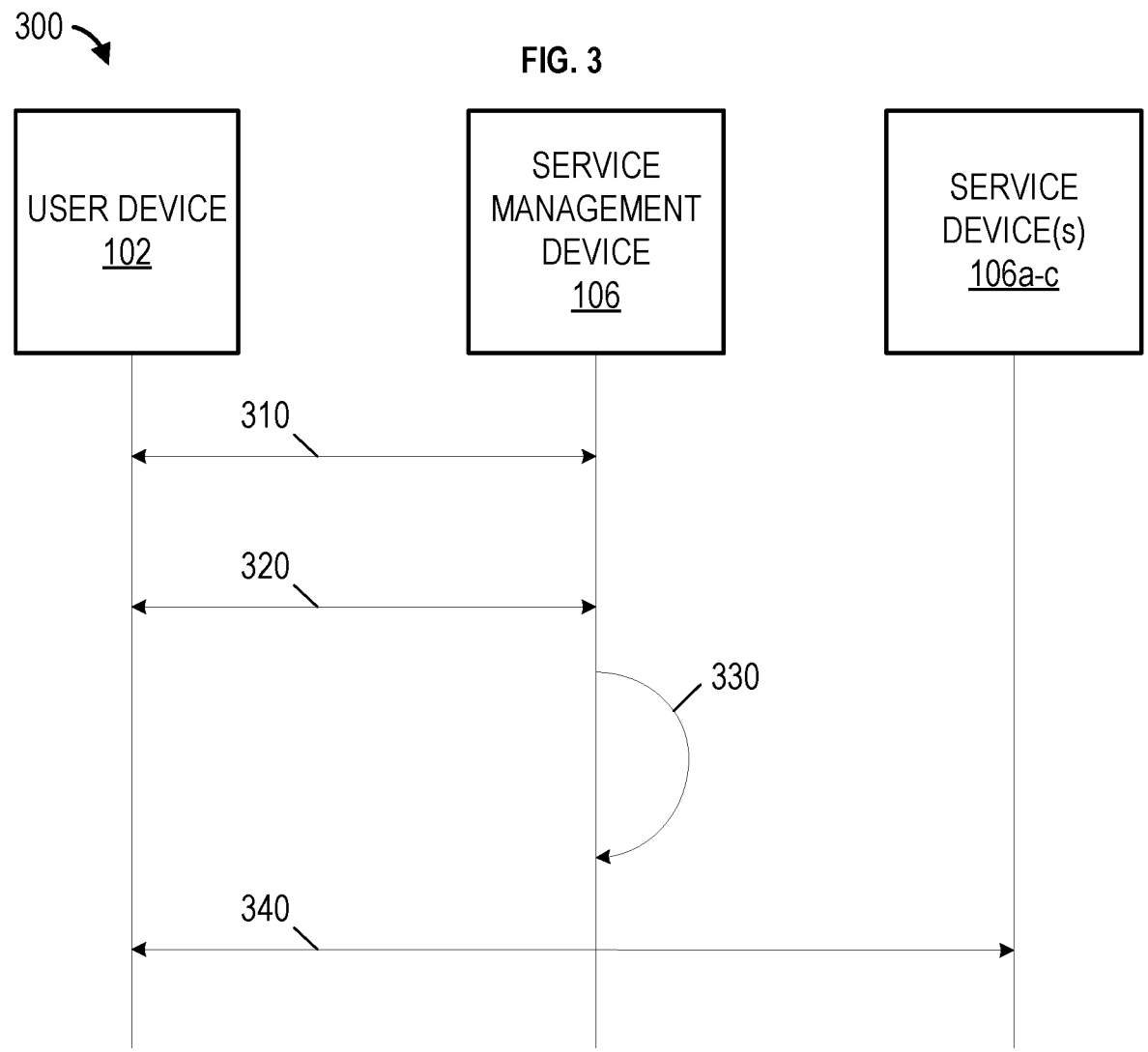
FIG. 3 shows an example communication diagram.

FIG. 3 shows an example communication diagram 300. The communication diagram 300 shows example communications between the user device 102 and the service management device 106 implementing HTTPS service based on a modified DoH service.

At 310, the user device 102, based on receiving a reply from the network device 106 including the hash value for the FQDN, the network address, and an indication of the hash value for the FQDN (e.g., in the DNS EDNS0 Header of the reply to the user device 102 under Option Code (OPT) 17 (EDNS-Server-Tag), etc.), the user device 102 may establish as transmission control protocol (TCP) session with the service management device 106. For example, the user device 102 and the service management device 106 may execute a handshaking communication process (e.g., a three-way handshake, etc.).

At 320, the user device 102 and the service management device 106 may establish a TLS session, for example, based on symmetric and asymmetric cryptography with appropriate session keys (e.g., public keys, private keys, etc.) and certificate authority. The user device 102 and the service management device 106 may execute a TLS handshake. The user device 102 may include the hash value for the FQDN received from the network device 104 in a TLS Client Hello SNI field instead of a clear-text FQDN when sending a TLS/HTTPS request to the service management device 106 (e.g., a resolved domain, etc.).

At 330, the service management device 106 may determine the hash value for the FQDN from the TLS Client Hello message received from the user device 102. The service management device 106 may use a pre-calculated and/or pre-determined list of modified versions of identifiers, such as hashed identifier values, encrypted identifiers, scrambled identifiers, and/or the like, that correspond to services hosted by the service management device 106. The service management device 106 may determine an appropriate service for the request from the user device 102 based on the hash value for the FQDN in the Client Hello SNI field of an eSNI message. For example, the service management device 106 may determine that the hash value for the FQDN from the TLS Client Hello message received from the user device 102 corresponds to a stored and/or pre-determined hash value for an FQDN and that the stored and/or pre-determined hash value for the FQDN is associated with the service. The service may be associated with a service device (e.g., service devices 106a, 106b, 106b, etc.).

At 340, the service management device 106 may forward the communication session with the user device 102 to the service device (e.g., service devices 106a, 106b, 106b, etc.) associated with a service (e.g., web service, etc.). For example, the user device 102 when attempting to reach and/or access the domain name "xfinity.com" (e.g., a website, etc.) to stream a movie (e.g., receive content, etc.) may have a session forwarded (e.g., the request routed, etc.) to the service device 106a, and when attempting to reach and/or access the domain name "xfinity.com" (e.g., a website, etc.) to access an account (e.g., receive a web service, etc.) may have a session forwarded (e.g., the request routed, etc.) to the service device 106b.

At 350, the user device may communicate with an appropriate service device (e.g., service devices 106a, 106b, 106b, etc.). For example, the TLS session may be fully proxied to a web service associated with a service device (e.g., service devices 106a, 106b, 106b, etc.).

Figure 4:
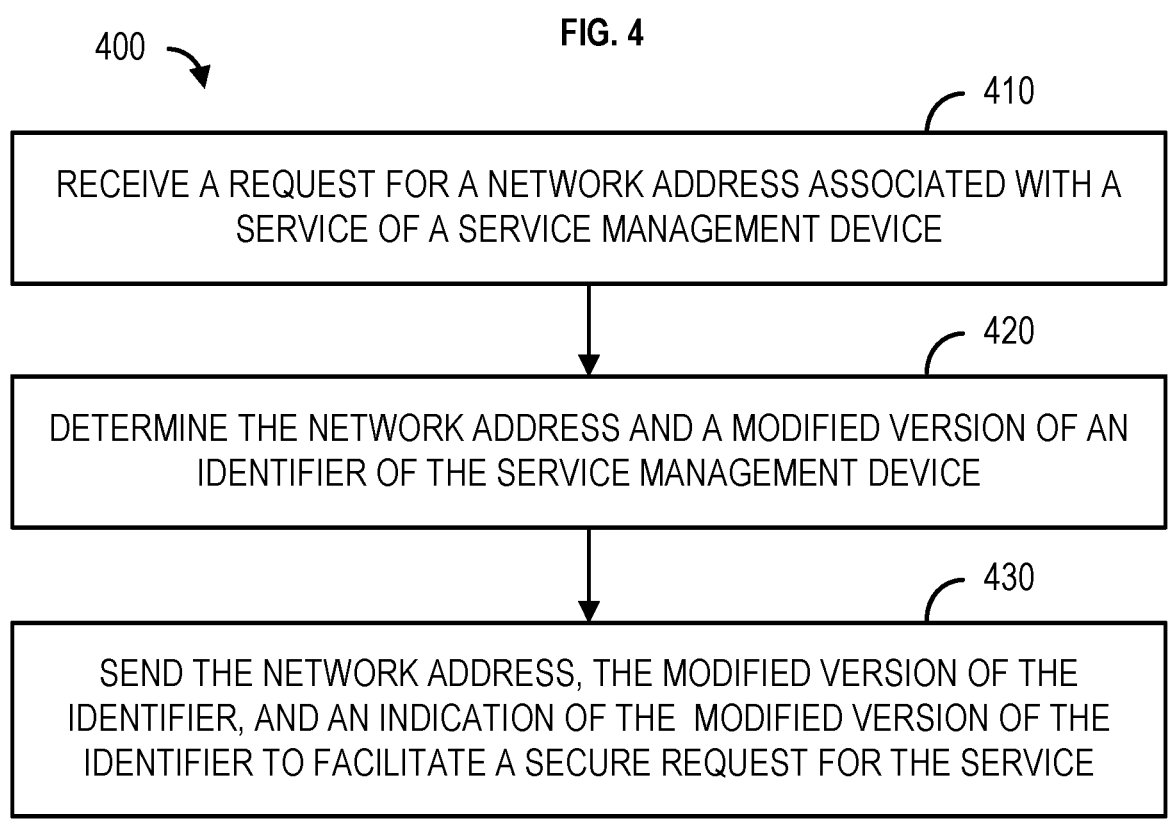
FIG. 4 shows a flowchart of an example method.

FIG. 4 shows a flowchart of an example method 400. A user device (e.g., a client device, a smart device, a mobile device, a content output device, a computing device, a web browser, a search engine, the user device 102, etc.) may send a request to access a domain (e.g., an Internet domain, a website, a webpage, etc.) and/or a resource (e.g., a webpage, a file, content, a content item, etc.) hosted by a domain, such as "comcast.com," "xfinity.com," and/or the like hosted by a service management device (e.g., a server, a web server, a computing device, a web host device, a webpage, the service management device 106, etc.). The user device may communicate with a network device (e.g., a server, a domain name system (DNS) server, a DNS over hypertext transfer protocol secure (HTTPS) server (DoH server), a network management device, a computing device, the network device 104, etc.) to obtain a network address (e.g., an Internet protocol (IP) address, etc.) associated with the domain. The network device may determine and send the network address, a modified (e.g., hashed, encrypted, etc.) identifier (e.g., a fully qualified domain name, etc.) of the domain and/or service management device, and an indication of the modified version of the identifier to the user device. The user device, based on the indication of the modified version of the identifier, may use the network address to communicate with the service management device to request content, a resource, and/or service (e.g., a web service, etc.) associated with the modified version of the identifier. The service management device may determine the modified version of the identifier from initial communication (e.g., handshaking, etc.) with the user device, and use the modified version of the identifier to facilitate the user device receiving the service, the resource, and/or the content associated with the modified version of the identifier.

The method 400 may include, at 410, receiving a request for a network address. The network device may receive a request for a network address associated with a service of the service management device (and/or the service management device). The request for the network address may include an identifier of the service management device, for example, a fully qualified domain name (FQDN) of the service management device (and/or the service of service management device). Receiving the request for the network address may include receiving the request from the user device. The request for the network address may include an encrypted domain name system (DNS) query. Receiving the request for the network address may include receiving the request for the network address via DNS over HTTPS (DoH). The network address may include and/or be an Internet protocol (IP) address.

A trust relationship may be determined. The network device may determine that a trust relationship with the service management device exists. A trust relationship may exist if the network device and the service management device are associated with the same administrative domain. For example, the network device and the service management device may be associated and/or operated by the same Content Distribution Network (CDN) provider and/or Content Service Provider (CSP) that provides both DNS and web services.

If the network device determines that a trust relationship does not exist between the network device and the service management device, then the request for the network address may be processed as a traditional encrypted DNS service request (e.g., based on RFC8484, RFC7858, RFC 8310, etc.). If the network device determines a trust relationship with the service management device, then the request for the network address may be processed as a modified service request, such as a modified encrypted DNS service and/or modified DoH service request. Determining that the trust relationship exists may include determining that the network device and the service management device are both associated with an administrative domain.

At 420, the network address and a modified version of the identifier may be determined. The network device may determine, based on the identifier, the network address and a modified version of the identifier of the service management device.

The network address may be determined, for example, based on a look-up table and/or the like that indicates identifiers (e.g., FQDNs, etc.) of service management devices and corresponding network addresses. The modified version of the identifier may include, for example, at least one of a hash of the identifier or an encrypted version of the identifier. For example, the modified version of the identifier may include at least one of a hash of the fully qualified domain name (FQDN) or an encrypted version of the FQDN.

The network device may determine, based on the existence of a trust relationship, the modified version of the identifier. For example, determining the modified version of the identifier may be further based on the network device determining that the network device and the service management device are associated with an administrative domain.

The modified version of the identifier may be determined according to a desired and/or provisioned level of security and or performance. For example, when the identifier of the service management device is hashed, a complex hashing algorithm may provide enhanced security, but reduce performance due to an extended hash computation period. A simple hash may be used for high performance (e.g., a reduced computational duration, etc.) and lower security. For high performance and lower security, the network device may use a simpler hash algorithm such as CRC-32. For lower performance and higher security, the network device may use a keyed hash algorithm that uses rotating keys. Any hashing algorithm and/or technique may be used.

At 430, the network address, the modified version of the identifier, and an indication of the modified version of the identifier may be sent. The network device may send the network address, the modified version of the identifier, and an indication of the modified version of the identifier to the user device. The indication of the modified version of the identifier may be configured to facilitate a secure request for the service by the user device.

For example, sending the network address and the modified version of the identifier may be based on DNS over HTTPS (DoH). The indication of the modified version of the identifier may include, for example, the modified version of the identifier in an EDNS-Server-Tag value of a DNS reply sent to the user device by the network device. The secure request for the service may include an encrypted server name indication (ESNI) request sent by the user device. For example, the secure request for the service may include a Client Hello message. A server name indication (SNI) field of the Client Hello message may include the modified version of the identifier.

The service management device may determine the hash value for the FQDN from the TLS Client Hello message received from the user device. The service management device may use a pre-calculated and/or pre-determined list of modified versions of identifiers, such as FQDN Hash values, that correspond to services hosted by the service management device. The service management device may determine an appropriate service for the request from the user device based on the hash value for the FQDN in the Client Hello SNI field of an eSNI message. For example, the service management device may determine that the hash value for the FQDN from the Client Hello message received from the user device corresponds to a stored and/or pre-determined hash value for an FQDN and that the stored and/or pre-determined hash value for the FQDN is associated with the service. The service may be associated with a service device (e.g., service devices 106a, 106b, 106b, etc.). The service device may send the user device the service and/or enable access to the service.

Figure 5:
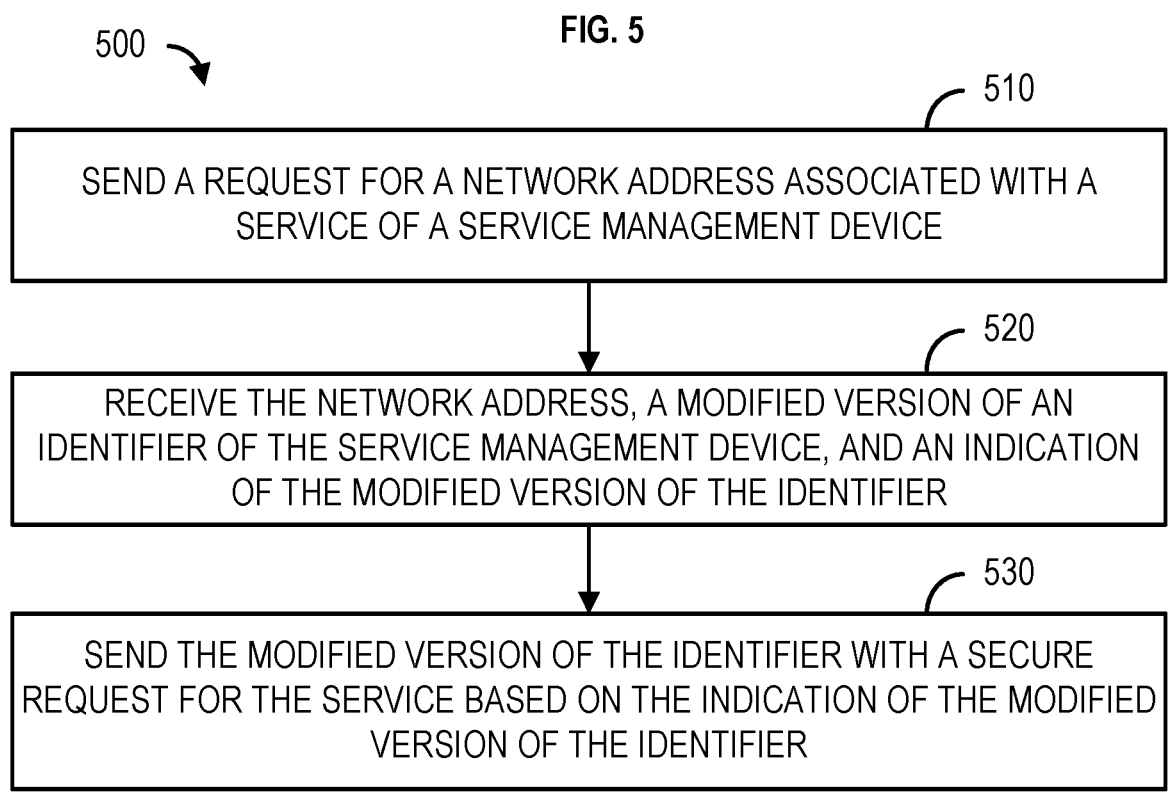
FIG. 5 shows a flowchart of an example method.

FIG. 5 shows a flowchart of an example method 500. A user device (e.g., a client device, a smart device, a mobile device, a content output device, a computing device, a web browser, a search engine, the user device 102, etc.) may send a request to access a domain (e.g., an Internet domain, a website, a webpage, etc.) and/or a resource (e.g., a webpage, a file, content, a content item, etc.) hosted by a domain, such as "comcast.com," "xfinity.com," and/or the like hosted by a service management device (e.g., a server, a web server, a computing device, a web host device, a webpage, the service management device 106, etc.). The user device may communicate with a network device (e.g., a server, a domain name system (DNS) server, a DNS over hypertext transfer protocol secure (HTTPS) server (DoH server), a network management device, the network device 104, etc.) to obtain a network address (e.g., an Internet protocol (IP) address, etc.) associated with the domain. The network device may determine and send the network address, a modified (e.g., hashed, encrypted, etc.) identifier (e.g., a fully qualified domain name, etc.) of the domain and/or service management device, and an indication of the modified version of the identifier to the user device.

The user device, based on the indication of the modified version of the identifier, may use the network address to communicate with the service management device to request content, a resource, and/or service (e.g., a web service, etc.) associated with the modified version of the identifier. The service management device may determine the modified version of the identifier from initial communication (e.g., handshaking, etc.) with the user device, and use the modified version of the identifier to facilitate the user device receiving the resource, content, and/or the service associated with the modified version of the identifier.

The method 500 may include, at 510, sending a request for a network address associated with a service of the service management device (and/or the service management device). The user device may send the request for the network address. The request may include an identifier of the service management device, for example, a fully qualified domain name (FQDN) of the service management device (and/or the service of service management device). The user device may send the request for the network address, for example, as an encrypted domain name system (DNS) query. Sending the request for the network address may include sending the request for the network address via DNS over HTTPS (DoH). The network address may include, for example, an Internet protocol (IP) address.

At 520, the network address, a modified version of an identifier of the service management device, and an indication of the modified version of the identifier may be received. The user device may receive the network address, the modified version of the identifier of the service management device, and the indication of the modified version of the identifier. The indication of the modified version of the identifier may be configured to facilitate a secure request for the service.

The user device may receive, based on the identifier of the service management device (and/or the service of the service management device), the network address, the modified version of the identifier of the service management device, and the indication of the modified version of the identifier. The user device may receive the network address, the modified version of the identifier of the service management device, and the indication of the modified version of the identifier, for example, based on a trust relationship between the network device and the service management device.

The network device may determine the network address, the modified version of the identifier of the service management device, and the indication of the modified version of the identifier as part of a modified DoH service process. The network address may be determined, for example, based on a look-up table and/or the like that indicates identifiers (e.g., FQDNs, etc.) of service management devices and corresponding network addresses.

The modified version of the identifier may include, for example, at least one of a hash of the FQDN or an encrypted version of the FQDN. The modified version of the identifier may be determined, for example, according to a desired and/or provisioned level of security and or performance. For example, when the modified version of the identifier is hashed, a complex hashing algorithm may provide enhanced security, but reduce performance due to an extended hash computation period. A simple hash may be used for high performance (e.g., a reduced computational duration, etc.) and lower security. For high performance and lower security, the network device may use a simpler hash algorithm such as CRC-32. For lower performance and higher security, the network device may use a keyed hash algorithm that uses rotating keys. Any hashing algorithm and/or technique may be used.

The indication of the modified version of the identifier may be configured to facilitate a secure request for the service. For example, the indication of the modified version of the identifier may include, the modified version of the identifier in an EDNS-Server-Tag value of a DNS reply sent to the user device by the network device.

The network device may determine that a trust relationship with the service management device exists. A trust relationship may exist if the network device and the service management device are associated with the same administrative domain. For example, the network device and the service management device may be associated and/or operated by the same Content Distribution Network (CDN) provider and/or Content Service Provider (CSP) that provides both DNS and web services.

If the network device determines that a trust relationship does not exist between the network device and the service management device, then a request from the user device for the network address may be processed as a traditional encrypted DNS service request (e.g., based on RFC8484, RFC7858, RFC 8310, etc.). If the network device determines a trust relationship with the service management device, then the request for the network address may be processed as a modified service request, such as a modified encrypted DNS service and/or modified DoH service request. Determining that the trust relationship exists may include determining, for example, based on stored/provisioned configuration information, that the network device and the service management device are both associated with an administrative domain.

At 530, the secure request for the service may be sent. The secure request for the service may include the modified version of the identifier. The user device may send the request for the service to the service management device. The secure request for the service may include, for example, an encrypted server name indication (ESNI) request sent by the user device. For example, the secure request for the service may include a Client Hello message. A server name indication (SNI) field of the Client Hello message may include the modified version of the identifier.

The service management device may receive the request for the service associated with the modified version of the identifier and determine the modified version of the identifier from the request. For example, the service management device may determine a hash value for the FQDN from a TLS Client Hello message received from the user device.

The user device, based on sending the request for the service, may receive the service. For example, the service management device may use a pre-calculated and/or pre-determined list of modified versions of identifiers, such as FQDN Hash values, that correspond to services hosted by the service management device. The service management device may determine a service device associated with the service. For example, the service management device may determine that the hash value for the FQDN from the Client Hello message received from the user device corresponds to a stored and/or pre-determined hash value for an FQDN and that the stored and/or pre-determined hash value for the FQDN is associated with the service. The service device may send the user device the service and/or enable access to the service.

Figure 6:
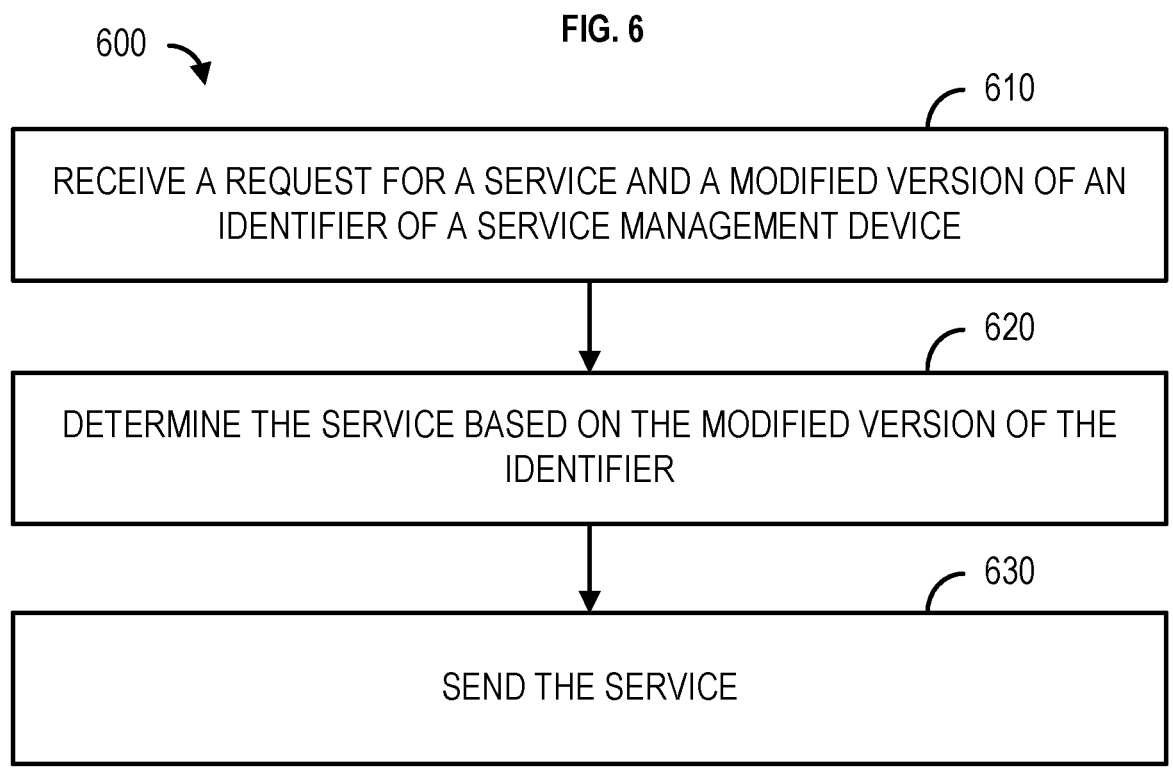
FIG. 6 shows a flowchart of an example method.

FIG. 6 shows a flowchart of an example method 600. A user device (e.g., a client device, a smart device, a mobile device, a content output device, a computing device, a web browser, a search engine, the user device 102, etc.) may send a request to access a domain (e.g., an Internet domain, a website, a webpage, etc.) and/or a resource (e.g., a webpage, a file, content, a content item, etc.) hosted by a domain, such as "comcast.com," "xfinity.com," and/or the like hosted by a service management device (e.g., a server, a web server, a computing device, a web host device, a webpage, the service management device 106, etc.). The user device may communicate with a network device (e.g., a server, a domain name system (DNS) server, a DNS over hypertext transfer protocol secure (HTTPS) server (DoH server), a network management device, a computing device, the network device 104, etc.) to obtain a network address (e.g., an Internet protocol (IP) address, etc.) associated with the domain. The network device may determine and send the network address, a modified (e.g., hashed, encrypted, etc.) identifier (e.g., a fully qualified domain name, etc.) of the domain and/or service management device, and an indication of the modified version of the identifier to the user device.

The user device, based on the indication of the modified version of the identifier, may use the network address to communicate with the service management device to request content, a resource, and/or service (e.g., a web service, etc.) associated with the modified version of the identifier. The service management device may determine the modified version of the identifier from initial communication (e.g., handshaking, etc.) with the user device, and use the modified version of the identifier to facilitate the user device receiving the resource, content, and/or the service associated with the modified version of the identifier.

The method 600 may include, at 610, receiving a secure request for a service. The service management device may receive the secure request for the service from the user device based on a network address associated with the service management device. The request for the service may include a modified version of an identifier. The modified version of the identifier may be modified based on a request for a network address associated with the service management device. Receiving the request for the service may include receiving the request based on the network address. The network address may include and/or be an Internet protocol (IP) address.

For example, the user device may request (e.g., via an encrypted domain name system (DNS) query, etc.) and receive (e.g., via DoH protocol, etc.) the network address and the modified version of the identifier from the network device. The user device may use the network address to send the secure request for the service. The service management device may determine the modified version of the identifier from the secure request for the service, for example, via initial communication (e.g., handshaking, etc.) with the user device. For example, receiving the secure request for the service may include, receiving a Client Hello message, wherein a server name indication (SNI) field of the Client Hello message comprises the modified version of the identifier. The service management device may use the modified version of the identifier to facilitate the user device receiving the service.

The modified version of the identifier may be modified by the network device. The network device may determine that a trust relationship with the service management device exists. A trust relationship may exist if the network device and the service management device are associated with the same administrative domain. For example, the network device and the service management device may be associated and/or operated by the same Content Distribution Network (CDN) provider and/or Content Service Provider (CSP) that provides both DNS and web services.

If the network device determines that a trust relationship does not exist between the network device and the service management device, then a request from the user device for the network address may be processed as a traditional encrypted DNS service request (e.g., based on RFC8484, RFC7858, RFC 8310, etc.). If the network device determines a trust relationship with the service management device, then the request for the network address may be processed as a modified service request, such as a modified encrypted DNS service and/or modified DoH service request. Determining that the trust relationship exists may include determining, for example, based on stored/provisioned configuration information, that the network device and the service management device are both associated with an administrative domain.

The modified version of the identifier may include, for example, at least one of the FQDN associated with the service management device or an encrypted version of the FQDN. The network address may be determined, for example, based on a look-up table and/or the like that indicates identifiers (e.g., FQDNs, etc.) of service management devices and corresponding network addresses.

The modified version of the identifier may be determined, for example, according to a desired and/or provisioned level of security and or performance. For example, when the modified version of the identifier is hashed, a complex hashing algorithm may provide enhanced security, but reduce performance due to an extended hash computation period. A simple hash may be used for high performance (e.g., a reduced computational duration, etc.) and lower security. For high performance and lower security, the network device may use a simpler hash algorithm such as CRC-32. For lower performance and higher security, the network device may use a keyed hash algorithm that uses rotating keys. Any hashing algorithm and/or technique may be used.

At 620, the service may be determined. The service management device may determine the service. For example, a correspondence between the modified version of the identifier and a service device associated with the service may be determined. The service management device may use a pre-calculated and/or pre-determined list of modified versions of identifiers, such as FQDN Hash values, that correspond to services and/or resources hosted by the service management device. The service management device may determine that the modified version of the identifier, for example, based on the hash value for the FQDN in the Client Hello SNI field of an eSNI message. The service management device may determine that the modified version of the identifier corresponds to the service device.

At 630, the request for the service may be sent. The service management device may cause the service to be sent to the user device. For example, the service management device may determine that the hash value for the FQDN from the Client Hello message received from the user device corresponds to a stored and/or pre-determined hash value for an FQDN and that the stored and/or pre-determined hash value for the FQDN is associated with the service. The service management device may send the service to the user device. The service management device may send the request for the service to the service device. The user device may receive the service from the service device. For example, the service device may send the user device the service and/or enable access to the service.

Figure 7:
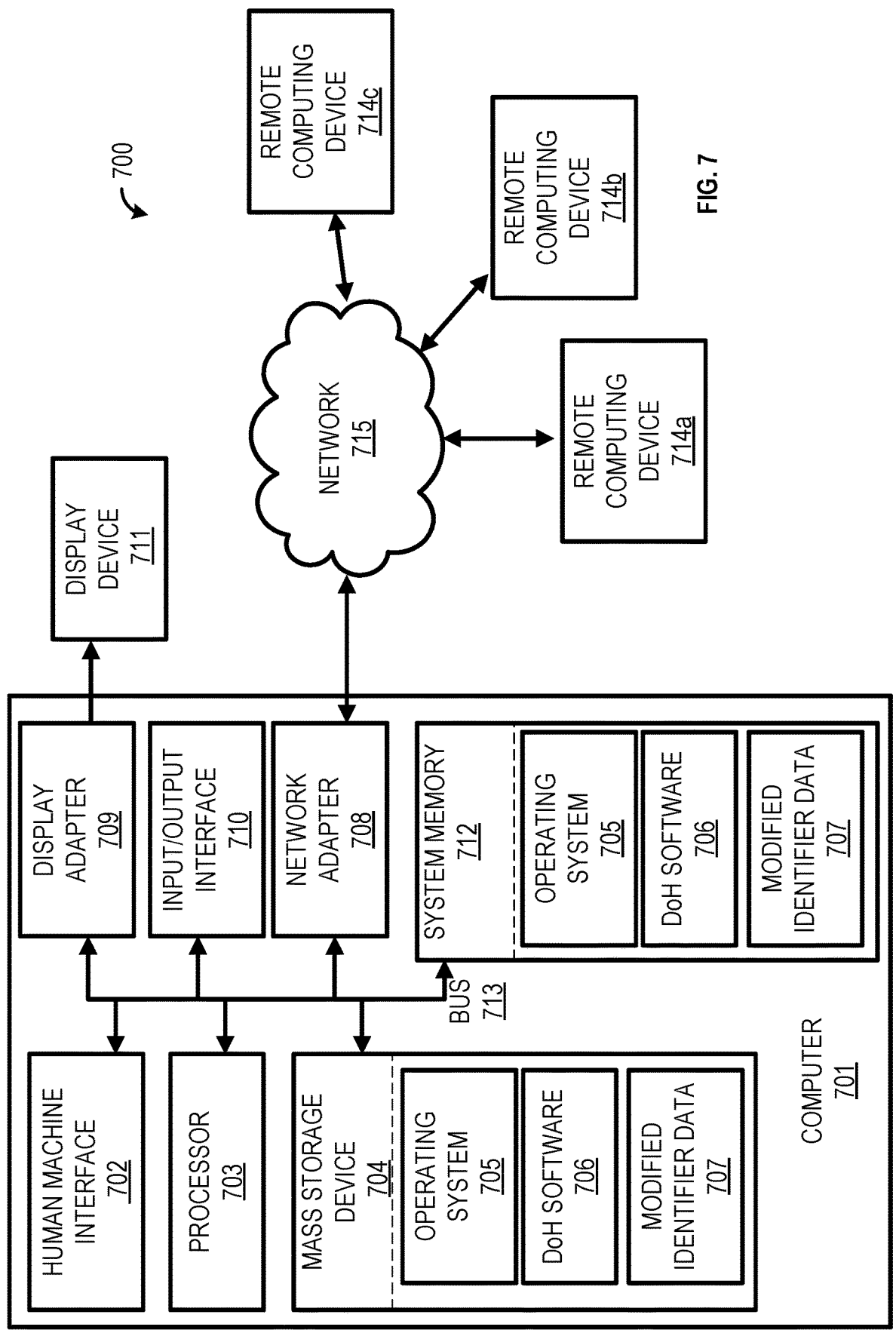
FIG. 7 shows a block diagram of an example computing device for implementing example methods.

FIG. 7 shows an example system 700. The system 700 may be used, for example, for accessing content using a modified version of an identifier. The user device 102, the network device 104, the service management device 106, and the service devices 106a, 106b, 106c (FIG. 1) may be a computer 701 as shown in FIG. 7.

The computer 701 may comprise one or more processors 703, a system memory 712, and a bus 713 that couples various components of the computer 701 including the one or more processors 703 to the system memory 712. In the case of multiple processors 703, the computer 701 may utilize parallel computing.

The bus 713 may comprise one or more of several possible types of bus structures, such as a memory bus, memory controller, a peripheral bus, an accelerated graphics port, and a processor or local bus using any of a variety of bus architectures.

The computer 701 may operate on and/or comprise a variety of computer-readable media (e.g., non-transitory). Computer-readable media may be any available media that is accessible by the computer 701 and comprises, non-transitory, volatile and/or non-volatile media, removable and non-removable media. The system memory 712 has computer-readable media in the form of volatile memory, such as random access memory (RAM), and/or non-volatile memory, such as read-only memory (ROM). The system memory 712 may store data such as modified identifier data 707 and/or program modules such as operating system 705 and modified DoH software 706 that are accessible to and/or are operated on by the one or more processors 703.

The computer 701 may also comprise other removable/non-removable, volatile/non-volatile computer storage media. The mass storage device 704 may provide non-volatile storage of computer code, computer-readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 704. An operating system 705 and modified DoH software 706 may be stored on the mass storage device 704. One or more of the operating system 705 and modified DoH software 706 (or some combination thereof) may comprise program modules and the modified DoH software 706. Modified identifier data 707 may also be stored on the mass storage device 704. Modified identifier data 707 may be stored in any of one or more databases known in the art. The databases may be centralized or distributed across multiple locations within the network 715.

A user may enter commands and information into the computer 701 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human-machine interface 702 that is coupled to the bus 713, but may be connected by other interface and bus structures, such as a parallel port, game port, an IEEE 1394 Port (also known as a Firewire port), a serial port, network adapter 708, and/or a universal serial bus (USB).

A display device 711 may also be connected to the bus 713 via an interface, such as a display adapter 709. It is contemplated that the computer 701 may have more than one display adapter 709 and the computer 701 may have more than one display device 711. A display device 711 may be a monitor, an LCD (Liquid Crystal Display), a light-emitting diode (LED) display, a television, smart lens, smart glass, and/or a projector. In addition to the display device 711, other output peripheral devices may comprise components such as speakers (not shown) and a printer (not shown) which may be connected to the computer 701 via Input/Output Interface 710. Any step and/or result of the methods may be output (or caused to be output) in any form to an output device. Such output may be any form of visual representation, including, but not limited to, textual, graphical, animation, audio, tactile, and the like. The display 711 and computer 701 may be part of one device, or separate devices.

The computer 701 may operate in a networked environment using logical connections to one or more remote computing devices 714a,b,c. A remote computing device 714a,b,c may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 701 and a remote computing device 714a,b,c may be made via a network 715, such as a local area network (LAN) and/or a general wide area network (WAN). Such network connections may be through a network adapter 708. A network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components may reside at various times in different storage components of the computing device 701, and are executed by the one or more processors 703 of the computer 701. An implementation of DOH software 706 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, by a network device, from a first computing device, a request for a network address associated with a service of a second computing device, wherein the request comprises an identifier associated with the second computing device;
   determining, by the network device, based on the identifier, the network address;
   generating, by the network device, a modified version of the identifier; and
   sending, by the network device, to the first computing device, a response comprising the network address, the modified version of the identifier, and an indication of the modified version of the identifier, wherein the indication of the modified version of the identifier is configured to cause the first computing device to send a secure request for the service comprising the modified version of the identifier.

2. The method of claim 1, wherein the service comprises a web service configured to facilitate access to a resource.

3. The method of claim 1, wherein receiving the request for the network address associated with the service comprises a DNS over HTTPS (DoH) server receiving the request for the network address.

4. The method of claim 1, wherein the first computing device comprises at least one of a client device, a mobile device, a content output device, or a web browser.

5. The method of claim 1, wherein the request for the network address comprises an encrypted domain name system (DNS) query.

6. The method of claim 1, wherein receiving the request for the network address comprises receiving the request for the network address via DNS over HTTPS (DoH).

7. The method of claim 1, wherein the second computing device comprises a web server.

8. The method of claim 1, wherein determining the modified version of the identifier is further based on determining that the second computing device is associated with an administrative domain.

9. The method of claim 1, wherein the identifier of the second computing device comprises a fully qualified domain name (FQDN), wherein the modified version of the identifier comprises at least one of a hash of the FQDN or an encrypted version of the FQDN.

10. The method of claim 1, wherein sending the network address and the modified version of the identifier is based on DNS over HTTPS (DoH), wherein the indication of the modified version of the identifier comprises an EDNS-Server-Tag value.

11. The method of claim 1, wherein the secure request for the service comprises an encrypted server name indication (ESNI) request.

12. The method of claim 1, wherein the secure request for the service comprises a Client Hello message, and wherein a server name indication (SNI) field of the Client Hello message comprises the modified version of the identifier.

13. A method comprising:
   sending, by a user device, to a network device, a request for a network address associated with a service of a computing device, wherein the request comprises an identifier of the computing device;
   receiving, from the network device, based on the identifier, a response comprising the network address, a modified version of the identifier generated by the network device, and an indication of the modified version of the identifier, wherein the indication of the modified version of the identifier is configured to cause the user device to send a secure request for the service comprising the modified version of the identifier; and
   sending, by the user device, to the computing device based on the network address, the secure request for the service.

14. The method of claim 13, wherein the service at least one of comprises a web service configured to facilitate access to a resource.

15. The method of claim 13, wherein sending the request for the network address comprises sending the request for the network address via DNS over HTTPS (DoH).

16. The method of claim 13, wherein sending the request for the network address comprises sending the request to the network device, and wherein receiving the modified version of the identifier and the indication of the modified version of the identifier is further based on the network device and the computing device being associated with an administrative domain.

17. The method of claim 13, wherein the indication of the modified version of the identifier comprises an EDNS-Server-Tag value.

18. An apparatus, comprising:
one or more processors; and
memory storing processor executable instructions that, when executed by the one or more processors, cause the apparatus to:
receive from a first computing device, a request for a network address associated with a service of a second computing device, wherein the request comprises an identifier associated with the second computing device;
determine based on the identifier, the network address;
generate a modified version of the identifier; and
send to the first computing device, a response comprising the network address, the modified version of the identifier, and an indication of the modified version of the identifier, wherein the indication of the modified version of the identifier is configured to cause the first computing device to send a secure request for the service comprising the modified version of the identifier.

19. The apparatus of claim 18, wherein the service comprises a web service configured to facilitate access to a resource.

20. The apparatus of claim 18, wherein the processor executable instructions that, when executed by the one or more processors, cause the apparatus to receive the request for the network address associated with the service cause a DNS over HTTPS (DoH) server to receive the request for the network address.

21. The apparatus of claim 18, wherein the first computing device comprises at least one of a client device, a mobile device, a content output device, or a web browser.

22. The apparatus of claim 18, wherein the request for the network address comprises an encrypted domain name system (DNS) query.

23. The apparatus of claim 18, wherein the processor executable instructions that, when executed by the one or more processors, cause the apparatus to receive the request for the network address cause the apparatus to receive the request for the network address via DNS over HTTPS (DoH).

24. The apparatus of claim 18, wherein the second computing device comprises a web server.

25. The apparatus of claim 18, wherein the processor executable instructions that, when executed by the one or more processors, cause the apparatus to determine the modified version of the identifier cause the apparatus to determine the modified version of the identifier based on determining that the second computing device is associated with an administrative domain.

26. The apparatus of claim 18, wherein the identifier of the second computing device comprises a fully qualified domain name (FQDN), and wherein the modified version of the identifier comprises at least one of a hash of the FQDN or an encrypted version of the FQDN.

27. The apparatus of claim 18, wherein the processor executable instructions that, when executed by the one or more processors, cause the apparatus to send the network address and the modified version of the identifier cause the apparatus to send the network address and the modified version of the identifier based on DNS over HTTPS (DoH), and wherein the indication of the modified version of the identifier comprises an EDNS-Server-Tag value.

28. The apparatus of claim 18, wherein the secure request for the service comprises an encrypted server name indication (ESNI) request.

29. The apparatus of claim 18, wherein the secure request for the service comprises a Client Hello message, and wherein a server name indication (SNI) field of the Client Hello message comprises the modified version of the identifier.

30. One or more non-transitory computer-readable media storing processor executable instructions that, when executed by at least one processor, cause the at least one processor to:
receive from a first computing device, a request for a network address associated with a service of a second computing device, wherein the request comprises an identifier associated with the second computing device;
determine based on the identifier, the network address;
generate a modified version of the identifier; and
send, to the first computing device, a response comprising the network address, the modified version of the identifier, and an indication of the modified version of the identifier, wherein the indication of the modified version of the identifier is configured to cause the first computing device to send a secure request for the service comprising the modified version of the identifier.

31. The one or more non-transitory computer-readable media of claim 30, wherein the service comprises a web service configured to facilitate access to a resource.

32. The one or more non-transitory computer-readable media of claim 30, wherein the processor executable instructions that, when executed by the at least one processor, cause the at least one processor to receive the request for the network address associated with the service cause a DNS over HTTPS (DoH) server to receive the request for the network address.

33. The one or more non-transitory computer-readable media of claim 30, wherein the first computing device comprises at least one of a client device, a mobile device, a content output device, or a web browser.

34. The one or more non-transitory computer-readable media of claim 30, wherein the request for the network address comprises an encrypted domain name system (DNS) query.

35. The one or more non-transitory computer-readable media of claim 30, wherein the processor executable instructions that, when executed by the at least one processor, cause the at least one processor to receive the request for the network address cause the at least one processor to receive the request for the network address via DNS over HTTPS (DoH).

36. The one or more non-transitory computer-readable media of claim 30, wherein the second computing device comprises a web server.

37. The one or more non-transitory computer-readable media of claim 30, wherein the processor executable instructions that, when executed by the at least one processor, cause the at least one processor to determine the modified version of the identifier cause the at least one processor to determine the modified version of the identifier based on determining that the second computing device is associated with an administrative domain.

38. The one or more non-transitory computer-readable media of claim 30, wherein the identifier of the second computing device comprises a fully qualified domain name (FQDN), and wherein the modified version of the identifier comprises at least one of a hash of the FQDN or an encrypted version of the FQDN.

39. The one or more non-transitory computer-readable media of claim 30, wherein the processor executable instructions that, when executed by the at least one processor, cause the at least one processor to send the network address and the modified version of the identifier is based on DNS over HTTPS (DoH), wherein the indication of the modified version of the identifier comprises an EDNS-Server-Tag value.

40. The one or more non-transitory computer-readable media of claim 30, wherein the secure request for the service comprises an encrypted server name indication (ESNI) request.

41. The one or more non-transitory computer-readable media of claim 30, wherein the secure request for the service comprises a Client Hello message, and wherein a server name indication (SNI) field of the Client Hello message comprises the modified version of the identifier.

42. A system comprising:
a network device configured to:
receive from a first computing device, a request for a network address associated with a service of a second computing device, wherein the request comprises an identifier associated with the second computing device;
determine, based on the identifier, the network address;
generate, a modified version of the identifier; and
send, to the first computing device, a response comprising the network address, the modified version of the identifier, and an indication of the modified version of the identifier, wherein the indication of the modified version of the identifier is configured to cause the first computing device to send a secure request for the service comprising the modified version of the identifier; and
the first computing device configured to send the request for the network address; and
the second computing device configured to provide the service.

43. The system of claim 42, wherein the service comprises a web service configured to facilitate access to a resource.

44. The system of claim 42, wherein the first computing device is configured to cause a DNS over HTTPS (DoH) server to receive the request for the network address.

45. The system of claim 42, wherein the first computing device comprises at least one of a client device, a mobile device, a content output device, or a web browser.

46. The system of claim 42, wherein the request for the network address comprises an encrypted domain name system (DNS) query.

47. The system of claim 42, wherein the network device is configured to receive the request for the network address by receiving the request for the network address via DNS over HTTPS (DoH).

48. The system of claim 42, wherein the second computing device comprises a web server.

49. The system of claim 42, wherein the network device is configured to determine the modified version of the identifier based on determining that the second computing device is associated with an administrative domain.

50. The system of claim 42, wherein the identifier of the second computing device comprises a fully qualified domain name (FQDN), wherein the modified version of the identifier comprises at least one of a hash of the FQDN or an encrypted version of the FQDN.

51. The system of claim 42, wherein the network device is configured to send the network address and the modified version of the identifier based on DNS over HTTPS (DoH), wherein the indication of the modified version of the identifier comprises an EDNS-Server-Tag value.

52. The system of claim 42, wherein the secure request for the service comprises an encrypted server name indication (ESNI) request.

53. The system of claim 42, wherein the secure request for the service comprises a Client Hello message, wherein a server name indication (SNI) field of the Client Hello message comprises the modified version of the identifier.

54. An apparatus, comprising:
one or more processors; and
memory storing processor executable instructions that, when executed by the one or more processors, cause the apparatus to:
send, to a network device, a request for a network address associated with a service of a computing device, wherein the request comprises an identifier of the computing device;
receive, from the network device, based on the identifier, a response comprising the network address, a modified version of the identifier generated by the network device, and an indication of the modified version of the identifier, wherein the indication of the modified version of the identifier is configured to cause the apparatus to send a secure request for the service comprising the modified version of the identifier; and
send, to the computing device based on the network address, the secure request for the service.

55. The apparatus of claim 54, wherein the service comprises at least one of a web service or facilitates access to a resource.

56. The apparatus of claim 54, wherein the processor executable instructions, that when executed by the one or more processors, cause the apparatus to send the request for the network address cause the apparatus to send the request for the network address via DNS over HTTPS (DoH).

57. The apparatus of claim 54, wherein the processor executable instructions, that when executed by the one or more processors, cause the apparatus to send the request for the network address cause the apparatus to send the request for the network address to the network device, and wherein the processor executable instructions, that when executed by the one or more processors, cause the apparatus to receive the modified version of the identifier and the indication of the modified version of the identifier based on the network device and the computing device being associated with an administrative domain.

58. The apparatus of claim 54, wherein the indication of the modified version of the identifier comprises an EDNS-Server-Tag value.

59. One or more non-transitory computer-readable media storing processor executable instructions that, when executed by at least one processor, cause the at least one processor to:
send, to a network device, a request for a network address associated with a service of a computing device, wherein the request comprises an identifier of the computing device;
receive, from the network device, based on the identifier, a response comprising the network address, a modified version of the identifier generated by the network device, and an indication of the modified version of the identifier, wherein the indication of the modified version of the identifier is configured to cause the at least one processor to send a secure request for the service comprising the modified version of the identifier; and send, to the computing device based on the network address, the secure request for the service.

60. The one or more non-transitory computer-readable media of claim 59, wherein the service comprises a web service configured to facilitate access to a resource.

61. The one or more non-transitory computer-readable media of claim 59, wherein the processor executable instructions that cause the at least one processor to send the request for the network address further cause the at least one processor to send the request for the network address via DNS over HTTPS (DoH).

62. The one or more non-transitory computer-readable media of claim 59, wherein the processor executable instructions that cause the at least one processor to send the request for the network address cause the at least one processor to send the request to the network device, and wherein the processor executable instructions that cause the at least one processor to receive the modified version of the identifier and the indication of the modified version of the identifier cause the at least one processor to receive the modified version of the identifier and the indication of the modified version of the identifier based on the network device and the computing device being associated with an administrative domain.

63. The one or more non-transitory computer-readable media of claim 59, wherein the indication of the modified version of the identifier comprises an EDNS-Server-Tag value.

64. A system, comprising:
a user device configured to:

send, to a network device, a request for a network address associated with a service of a computing device, wherein the request comprises an identifier of the computing device;

receive, from the network device, based on the identifier, a response comprising the network address, a modified version of the identifier generated by the network device, and an indication of the modified version of the identifier, wherein the indication of the modified version of the identifier is configured to cause the user device to send a secure request for the service comprising the modified version of the identifier; and send, to the computing device based on the network address, the secure request for the service; and the network device configured to receive the request for the network address; and the computing device configured to receive the secure request for the service.

65. The system of claim 64, wherein the service comprises a web service configured to facilitate access to a resource.

66. The system of claim 64, wherein the user device is further configured to send the request for the network address via DNS over HTTPS (DoH).

67. The system of claim 64, wherein the user device is further configured to send the request for the network address by sending the request to the network device, and wherein the user device is further configured to receive the modified version of the identifier and the indication of the modified version of the identifier based on the network device and the computing device being associated with an administrative domain.

68. The system of claim 64, wherein the indication of the modified version of the identifier comprises an EDNS-Server-Tag value.

* * * * *